US012606883B2

(12) United States Patent
Joyce

(10) Patent No.: US 12,606,883 B2
(45) Date of Patent: Apr. 21, 2026

(54) BINDER FORMULATION

(71) Applicant: Binding Solutions Ltd, Middlesbrough (GB)

(72) Inventor: Richard Joyce, Middlesbrough (GB)

(73) Assignee: Binding Solutions Ltd, Middlesbrough (GB)

( * ) Notice: Subject to any disclaimer, the term of this patent is extended or adjusted under 35 U.S.C. 154(b) by 608 days.

(21) Appl. No.: 17/268,910

(22) PCT Filed: Aug. 15, 2019

(86) PCT No.: PCT/GB2019/052292
§ 371 (c)(1),
(2) Date: Feb. 16, 2021

(87) PCT Pub. No.: WO2020/035691
PCT Pub. Date: Feb. 20, 2020

(65) Prior Publication Data
US 2021/0301370 A1     Sep. 30, 2021

(30) Foreign Application Priority Data
Aug. 16, 2018     (GB) ...................................... 1813370

(51) Int. Cl.
*C22B 1/242*          (2006.01)
*C08K 3/34*           (2006.01)
(Continued)

(52) U.S. Cl.
CPC ................ *C22B 1/242* (2013.01); *C08K 3/34* (2013.01); *C08K 5/5419* (2013.01); *C08L 1/04* (2013.01); *C08L 5/00* (2013.01)

(58) Field of Classification Search
CPC ....... C22B 1/242; C22B 1/2406; C22B 1/248; C08K 3/34; C08K 5/5419; C08K 3/36; C08K 5/5435; C08L 1/04; C08L 5/00
See application file for complete search history.

(56) References Cited

U.S. PATENT DOCUMENTS 9,096,914 B2     8/2015  Pimenta et al.
2002/0152839 A1*  10/2002  Aota ......................... C22B 7/02
                                                                  75/230
(Continued)

FOREIGN PATENT DOCUMENTS

CN          1890391 A       1/2007
CN          101525688 A     9/2009
(Continued)

OTHER PUBLICATIONS

De Moraes, S. L., and S. K. Kawatra. "Laboratory study of an organic binder for pelletization of a magnetite concentrate." Mining, Metallurgy & Exploration 27 (2010): 148-153. (Year: 2010).*
(Continued)

*Primary Examiner* — Keith D. Hendricks
*Assistant Examiner* — Moriah S. Smoot
(74) *Attorney, Agent, or Firm* — Meunier Carlin & Curfman LLC

(57) ABSTRACT

A binder formulation for iron ore pellets, the formulation comprising one or more silicates and a processing aid, a pellet comprising this binder formulation and a process for producing iron ore pellets comprising mixing a binder formulation as described with particulate iron ore and forming pellets.

15 Claims, 1 Drawing Sheet

(51) Int. Cl.

| | | |
|---|---|---|
| *C08K 5/5419* | (2006.01) | |
| *C08L 1/04* | (2006.01) | |
| *C08L 5/00* | (2006.01) | |

(56) References Cited

U.S. PATENT DOCUMENTS

| | | | | |
|---|---|---|---|---|
| 2007/0119563 | A1* | 5/2007 | Schmitt | C22B 1/242 |
| | | | | 164/528 |
| 2009/0249921 | A1 | 10/2009 | Osborne et al. | |
| 2011/0232420 | A1* | 9/2011 | Porto Pimenta | C22B 1/16 |
| | | | | 75/228 |
| 2013/0243973 | A1* | 9/2013 | Dutra | C22B 1/243 |
| | | | | 427/560 |
| 2014/0020511 | A1* | 1/2014 | Pimenta | C22B 1/243 |
| | | | | 75/755 |

FOREIGN PATENT DOCUMENTS

| | | | | | |
|---|---|---|---|---|---|
| CN | 101586184 | A | | 11/2009 | |
| CN | 101775489 | A | | 7/2010 | |
| CN | 102002583 | A | | 4/2011 | |
| CN | 104704133 | A | * | 6/2015 | ......... C21B 13/0053 |
| CN | 105483370 | A | | 4/2016 | |
| EP | 0288150 | A1 | * | 2/1994 | |
| JP | 2013510954 | A | | 3/2013 | |
| JP | 2014526612 | A | | 10/2014 | |
| WO | WO-2010023691 | A1 | * | 3/2010 | ......... C21B 13/0046 |
| WO | 2011061627 | A1 | | 5/2011 | |
| WO | 2013033805 | A1 | | 3/2013 | |
| WO | 2020035691 | A1 | | 2/2020 | |

OTHER PUBLICATIONS

Eisele, T. C., and S. K. Kawatra. "A review of binders in iron ore pelletization." Mineral Processing and Extractive Metallurgy Review 24.1 (2003): 1-90. (Year: 2003).*

He, Y., et al. "DEM study of the mechanical strength of iron ore compacts." International Journal of Mineral Processing 142 (2015): 73-81. (Year: 2015).*

Dwarapudi, Srinivas, et al. "Development of cold bonded chromite pellets for ferrochrome production in submerged arc furnace." ISIJ international 53.1 (2013): 9-17. (Year: 2013).*

Lentz, Charles W. "Silicate minerals as sources of trimethylsilyl silicates and silicate structure analysis of sodium silicate solutions." Inorganic chemistry 3.4 (1964): 574-579. (Year: 1964).*

Han, Hongliang, Dongping Duan, and Peng Yuan. "Binders and bonding mechanism for RHF briquette made from blast furnace dust." ISIJ International 54.8 (2014): 1781-1789. (Year: 2014).*

Mansheng, "Raw Fuel and Auxiliary Materials for Iron and Steel Metallurgy", Metallurgical Industry Press, Jan. 31, 2010 pp. 73-74.

Qi, "Theory and Practice of Pellet", Central South University of Technology Press, Feb. 28, 1991, pp. 235-239.

International Preliminary Report on Patentability for International Application No. PCT/GB2019/052292, Report issued Feb. 16, 2021, Mailed Feb. 25, 2021, 6 Pgs.

International Search Report and Written Opinion for International Application No. PCT/GB2019/052292, Search completed Oct. 1, 2019, Mailed Oct. 14, 2019, 8 Pgs.

Halt et al., "Cold Bonding of Iron Ore Concentrate Pellets", Mineral Processing & Extractive Metall. Rev., 2015, 36: 192-197.

Dai et al., "Ferroalloy Engineering Technology", Metallurgical Industry Press, Aug. 2015; pp. 189-192.

Zhu et al., "Chemistry of Casting Materials", China Machine Press, Oct. 1990, pp. 141-142.

* cited by examiner

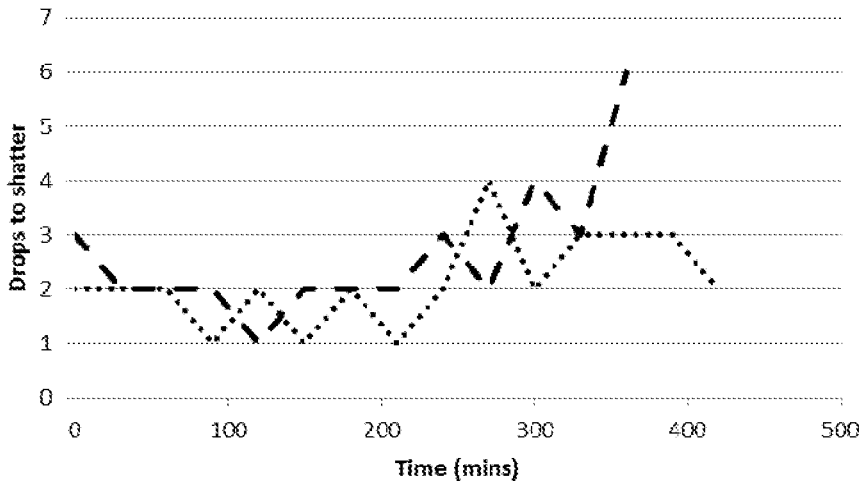

BINDER FORMULATION

CROSS REFERENCE TO RELATED APPLICATIONS

This application is a national stage of PCT Patent Application No. PCT/GB2019/052292, entitled "Binder Formulation" to Richard, filed Aug. 15, 2019, which claims priority to Patent Application No. GB 1813370.2, entitled "Binder Formulation" to Richard, filed Aug. 16, 2018, the disclosures of which are incorporated by reference herein in their entirety.

FIELD OF THE INVENTION

The invention relates to a binder formulation for an iron ore pellet. In particular to a binder formulation comprising a silicate, to iron ore pellets comprising the binder formulation and to methods of making these.

BACKGROUND OF THE INVENTION

The production of briquettes from particulate iron and other metal ores is generally known in the art. Breakages of the agglomerated briquettes are common, and typically the particles are bound together using a binder such as cement or clay in the hope of improving strength.

Such briquettes are used in a blast furnace or in direct iron reduction (DRI). The briquette is designed to be sufficiently strong to allow the briquette to be successfully transported and to be used within the blast furnace. The briquette must be able to retain its integrity through the blast furnace into the melting furnace, otherwise the performance of blast furnaces or DRI plants can be adversely affected. A problem associated with using cement or clay is that this increases the amount of silica in the iron and slag produced at the end of the process.

The high strength required for such briquettes has limited the use of more expensive binders such as starch or polyvinyl alcohol (PVA), and so it would be desirable to provide a cost-effective alternative to existing binder formulations which can offer excellent agglomeration, rapid curing and excellent green strength.

SUMMARY OF THE INVENTION

The invention is intended to overcome or ameliorate at least some aspects of these problems in accordance with the following embodiments.

Various embodiments are directed to a binder formulation for an iron ore pellet, the formulation including one or more silicates and a processing aid.

In still various embodiments the silicate comprises a group I or group II silicate.

In yet various embodiments the silicate comprises sodium silicate.

In still yet various embodiments the silicate is present in the range 75-95 wt % of the formulation.

In yet still various embodiments the processing aid comprises an additive selected from a polysaccharide, a cellulosic thickening agent and combinations thereof.

In still yet various embodiments the polysaccharide and/ or a cellulosic thickening agent is selected from guar gum, gum arabic, xanthan gum, starch, hydroxyethyl cellulose, methyl cellulose, methyl hydroxyethyl cellulose and combinations thereof.

In yet still various embodiments the processing aid is present in the formulation in the range 5-25 wt % of the formulation.

In still yet various embodiments the formulation additionally includes a setting agent.

In yet still various embodiments the setting agent is selected from glycerol triacetate, glycidoxypropyltrimethoxysilane, fumed silica, potassium methylsiliconate and combinations thereof.

Many other embodiments are directed to an iron ore pellet including a binder formulation as described above.

In still many embodiments the formulation has a range of 1-10 wt % silicate.

In yet many embodiments the formulation has a range of 0.1-2 wt % processing aid.

Still other embodiments are directed to processes for producing iron ore pellets including:

mixing a binder formulation according to any of claims 1 to 9 with particulate iron ore; and
    forming pellets.

In yet other embodiments pellets are formed using a method selected from extrusion, pan pelletisation and briquetting.

BRIEF SUMMARY OF THE FIGURES

FIG. 1 is a graph illustrating the green strength of silicate containing pellets (dashed lines) relative to non-silicate containing pellets (dotted lines).

DETAILED DESCRIPTION

Accordingly, in a first aspect of the invention there is provided a binder formulation for an iron ore pellet, the formulation comprising one or more silicates and a processing aid. The presence of the silicates has been shown to facilitate agglomeration and curing, it is believe by promoting ion exchange between the silicate counter ion (such as sodium) and iron in the iron ore. This results in rapid hardening and excellent green strength, reducing the curing time needed prior to transport of the briquettes and reducing losses in transit and in use in the blast furnace. The inclusion of a silicate removes the need to take the undesirable step of either heating the pellets to harden or the step of including chemical curing agents. A heating step is undesirable as it increases the complexity of the pellet formation process, and the energy required increases the cost; chemical curing agents are generally also expensive or require further processing steps (as is the case where carbon dioxide curing is used) and so it is advantageous to avoid their use.

Typically the silicate comprises a group I or group II silicate, often sodium or calcium silicate. Sodium silicate has been found to be particularly beneficial possibly due to ion lability. Sodium silicate is also readily available and inexpensive. Where used, the sodium silicate may be of Na:Si ratio greater than 2.5, or 2.8 as at these ratios the optimal balance between viscosity for dispersion and rapid curing it obtained. It will often be the case that the silicate is present in the range 60-98 wt %, often 75-95 wt % of the formulation. At these levels rapid curing is observed, leading to excellent green strength after minimal time has elapsed from pellet formation.

It should be noted that the term "pellet" includes objects commonly referred to as pellets, rods, pencils slugs. Pellets typically have a maximum average diameter of 20 mm, more typically 16 mm or 15 mm, a minimum average diameter of 2 mm, especially 5 mm or an average diameter of 10-12 mm.

These object share the common feature of being a compacted form of material and are differentiated principally by their size and shape.

The processing aid may comprise an additive selected from a polysaccharide, a cellulosic thickening agent and combinations thereof. Often, the polysaccharide and/or a cellulosic thickening agent is selected from guar gum, gum arabic, xanthan gum, starch, hydroxyethyl cellulose, methyl cellulose, methyl hydroxyethyl cellulose and combinations thereof. These processing aids have been found to both thicken and stabilise the pellets, reducing chemical degradation and improving shelf life. Further, the selection of non-cement based processing aids removes the common problem of increasing slag produced during iron processing, and it is a feature of the invention that there is no need to add cement or clay based processing aids. Guar gum and methyl hydroxyethyl cellulose are often used as these processing aids have been found not only to aid processing of the iron ore into pellets, but also to further improve green strength relative to pellets which contain silicate only. Guar gum may be used where the environmental credentials of the iron ore pellets are of concern, as this is a natural product. The processing aid may be present in the formulation in the range 5-25 wt % or 10-20 wt % of the formulation, it has been found that with extrusion processing these levels of processing aid prevent stalling of the extruder through clogging or other ingress of particulate matter into the mechanics of the extrusion machinery.

A setting agent may also be present, this may promote polymerisation of the silicate leading to gelling and enhanced agglomeration. The setting agent may be selected from glycerol triacetate, glycidoxypropyltrimethoxysilane, fumed silica, potassium methylsiliconate and combinations thereof. Often the setting agent will comprise glycidoxypropyltrimethoxysilane as this offers excellent adhesion. The setting agent may be present in the range 0.5-1.0 wt % of the binder formulation.

A surfactant such as SLS (sodium lauryl sulphate) may be added, for example, a trace amount to improve the wetting of the iron powered by the additives.

A waterproofing agent may be used to enhance the weather resistance of the material of the pellet. This may be combined with a particulate material or as a layer on the external surface of the pellet, for example by spraying. This includes, for example, styrene-acrylate copolymers, and bitumen emulsions.

It may be that the binder formulation is pre-mixed such that the entire formulation is then added to the particulate iron ore during pellet production, such that a "ready-mix" binder product is provided. Or it may be that the binder formulation is prepared in situ, such that the individual components are added directly to the particulate iron ore where they are mixed with one another simultaneously to mixing with the iron ore. For instance, the processing aid may be added to the iron ore before the silicate, or the silicate added before the processing aid. Where the silicate is added before the processing aid a strong bond is formed between the silicate and the iron enhancing the rate of curing.

In a second aspect of the invention there is provided an iron ore pellet comprising, a binder formulation according to the first aspect of the invention. The pellet may comprise in the range 1-10, often 2-6 wt % wt % silicate, and independently in the range 0.1-2 wt % or 0.5-1.5 wt % processing aid. At these levels, the pellet has been found to agglomerate well, be easy to process (particularly through extrusion methods), and exhibit rapid curing and green strength.

The pellet will also comprise particulate iron ore, this is typically of a diameter 4 mm or less, more typically less than 1 mm, or less than 500 $\mu$m or less than 100 $\mu$m. This may be determined by being able to pass through a sieve. Typically at least 10% by weight of particulate material is capable of passing through a 100 $\mu$m sieve before to forming into a pellet. More typically a sieve size of 30 $\mu$m or 20 $\mu$m is used to sieve the material. At least 50%, 80% or 100% of the material may pass through the sieve.

Typically the iron ore are tailings or dust, from example, from electric arc furnaces. The ore may be magnetite ($Fe_3O_4$) and/or haematite ($Fe_2O_3$). The iron ore may comprise naturally occurring contaminants.

The particulate iron ore may have a moisture content of less than 50%, more typically less than 30% or less than 25% moisture content. Typically the moisture content is at least 2% or at least 5% or 10% by weight.

In a third aspect of the invention there is provided a process for producing iron ore pellets comprising: mixing a binder formulation according to the first aspect of the invention with particulate iron ore; and forming pellets. Often, the pellets are formed using a method selected from extrusion, pan pelletisation and briquetting, all of which are known in the art.

Typically twin-shaft batching mixtures are used to agglomerate the mixture. Overall a press or an extruder is typically used to form the pellets. It will most often be the case that extrusion techniques are used, in particular low moisture content extrusion (also known as stiff extrusion) techniques. It has been found that using the binder formulation in extrusion, and in particular in stiff extrusion techniques blocking or clogging of the extruder is dramatically reduced, such that processing downtime is minimised. Further, heat produced by the extrusion processing of the mixture dries the mixture, and ion exchange between the silicate and iron in the iron ore facilitates agglomeration and hence setting. This combination allows for the production of strong pellets which, because they require minimal curing time, are ready for transport very soon after production.

The pellet is typically cold formed, for example without sintering, or heating to above 60° C. or above 40° C. of 30° C. prior to being put in the furnace.

The amount of compaction of the pellet may be varied, for example, by placing the mixture of the particulate iron ore and binder formulation under greater or lesser amounts of vacuum depending upon the amount of compaction required. A greater amount of vacuum will increase the compaction of the pellet. Alternatively, this may be controlled by the amount of pressure used to form the pellet.

A binder formulation for an iron ore pellet, the formulation comprising: in the range 75-95 wt % sodium silicate; in the range 5-25 wt % a processing aid selected from guar gum and methyl hydroxyethyl cellulose and combinations thereof; and in the range 0.1 or 0.5-1.0 wt % of a setting agent comprising glycidoxypropyltrimethoxysilane.

An iron ore pellet comprising, the binder formulation, the pellet comprising, in the range 1-10 wt % sodium silicate and in the range 0.1-2 wt % guar gum and/or methyl hydroxyethyl cellulose.

A process for producing iron ore pellets comprising: mixing the binder formulation with particulate iron ore; and forming pellets by extrusion.

Unless otherwise stated, each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

In order that the invention may be more readily understood, it will be described further with reference to FIG. 1 and to the specific examples hereinafter.

FIG. 1 is a graph illustrating the green strength of silicate containing pellets (dashed lines) relative to non-silicate containing pellets (dotted lines).

Iron Ore Composition

Iron ore comprising a combination of $Fe_2O_3$ and $Fe_3O_4$ was analysed to identify contaminants. The results are below.

| | Fe | CaO | $SiO_2$ | MnO | $Al_2O_3$ | $P_2O_5$ | $K_2O$ | $TiO_2$ | $Na_2O$ | $Cr_2O_3$ |
|---|---|---|---|---|---|---|---|---|---|---|
| A | 68.3 | 0.1 | 4 | 0.15 | 1.69 | 0.06 | | 0.1 | 0.4 | 0.1 |
| B | 68.9 | 0.1 | 1.35 | 0.1 | 3.35 | 0.07 | | 0.1 | 0.1 | 0.1 |
| C | 66.6 | 0 | 3.98 | 0.15 | 1.73 | 0.06 | 0 | 0.1 | 0 | 0 |
| D | 67.5 | 0 | 1.3 | 0.1 | 3.43 | 0.08 | 0 | 0.1 | 0 | 0 |
| E | 68.35 | | 5.2 | 0.1 | 0.65 | 0.1 | 0 | 0.1 | 0 | 0.2 |

Analysis of Samples A and B was by the Materials Processing Institute and C-E by the Advanced Metallurgical Group Pellet Compositions Tested

| Component | Range Tested | Results Shown For |
|---|---|---|
| Iron Ore Concentrate ($Fe_2O_3$ and $Fe_3O_4$) | 66.5-68.4 wt % | Sample E |
| Sodium silicate (d90 V 100 μm, 40% solution, Na:Si ratio > 2.8) | 3-10 wt % | 5 wt % |
| Guar Gum (viscosity 30007000 cps) | 0.5-1.5 wt % | 0.5 wt % |

Pellet Formation

Guar gum was added as a powder to particulate iron ore in a twin shaft mixer and mixed at high speed. Sodium silicate was then added with mixing. Once a homogeneous mixture was formed, the mixed batches were extruded using an Edwards and Jones extruder under vacuum (–600 to –1000 mbar) to provide 16 mm densely agglomerated pellets. The pellets were left to cure for 24 hours @30° C. before testing.

Test Methods

The test pellets were compared for compressive strength, resistance to impact and sinter degradation during reduction. The tests were all completed in accordance with British Standards Institution test guidelines.

| Test | British Standard | ISO Number |
|---|---|---|
| Compressive strength | Cold crushing strength | 4700 |
| Resistance to impact | Tumbler index | 3271 |
| Sinter degradation | Reduction disintegration | 4696-1 and 4696-2 |

Results were verified by two independent laboratories, the Materials Processing Institute and the Advanced Metallurgical Group.

Also completed was a "drop test" comprising repeated dropping of a pellet from a height of two meters until the pellet shattered on impact. The results of this are shown in FIG. 1.

Test Data

| | | Strength | Tumbler | | |
|---|---|---|---|---|---|
| Sample* | Test Date | (kgf) | TI | AI | RDI |
| 215/18e | 15 Jun. 2018 | 254 | 95.1 | 4.6 | 2.0 |
| 221/18e | 19 Jun. 2018 | 280 | 90.5 | 8.7 | 1.9 |
| 224/18e | 20 Jun. 2018 | 234 | 93.4 | 6.2 | 2.8 |

*Samples of identical formulation, table shows three repetitions

The single formulation sample was tested three times to ensure repeatability. On all occasions the results were above the industry norms for iron ore pellets.

Specifically, it is desirable for an iron ore pellet to have a cold crushing strength of greater than 200 kgf, a tumbler index value of greater than 90%, an abrasion index value of less than 10 and a reduction disintegration index value of less than 10.

As can be seen, all tests exceed these values, with the pellets showing particularly good compressive green strength, excellent abrasion properties and resistance to sintering degradation.

Processing Enhancement

It was observed that where guar gum was absent processing was significantly more difficult, with frequent stalling or overloading of the extruder.

Strength of Silicate Containing Pellets

FIG. 1 shows a comparison between a silicate containing pellet and a non-silicate containing pellet when dropped repeatedly until shatter. As time passes, the silicate containing pellet shows a marked increase in the number of drops required to shatter the pellet, illustrating a better green strength relative to the non-silicate containing pellets. Specifically, after 400 minutes, the non-silicate containing pellets will only survive on average 3 drops, relative to 2 immediately after production (t=0). In comparison, after just 350 minutes the average number of drops survived by the silicate containing pellets is 6, relative to 3 immediately after production.

It would be appreciated that the process and formulation of the invention are capable of being implemented in a variety of ways, only a few of which have been illustrated and described above.

The invention claimed is:

1. An iron ore pellet, comprising:
iron ore and a binder formulation,
wherein the binder formulation comprises:
one or more silicates, and
a processing aid comprising at least one cellulosic thickening agent,
wherein the silicate is present in the binder formulation in a range of 60-98 wt. % of the binder formulation,
wherein the processing aid is present in the binder formulation in a range of 5-25 wt. % of the binder formulation, and
wherein the iron ore pellet comprises the one or more silicates in the range of 1-10 wt. % of the iron ore pellet.

2. The iron ore pellet according to claim 1, wherein the one or more silicates comprises a Period Table of Elements s-block group I or group II silicate.

3. The iron ore pellet according to claim 1, wherein the one or more silicates comprises sodium silicate.

4. The iron ore pellet according to claim 1, wherein the processing aid further comprises a polysaccharide.

5. The iron ore pellet according to claim 1, wherein the processing aid further comprises at least one of guar gum, gum arabic, xanthan gum, starch, hydroxyethyl cellulose, methyl cellulose, methyl hydroxyethyl cellulose and combinations thereof.

6. The iron ore pellet according to claim 1, additionally comprising a setting agent.

7. The iron ore pellet according to claim 6, wherein the setting agent is selected from glycerol triacetate, glycidoxy-propyltrimethoxysilane, fumed silica, potassium methylsiliconate and combinations thereof.

8. The iron ore pellet according to claim 1, wherein the processing aid is present in the range of 0.1-2 wt % of the iron ore pellet.

9. A process for producing iron ore pellets, the process comprising:
mixing a binder formulation with particulate iron ore to form a mixture; and
forming pellets from the mixture;
wherein the binder formulation comprises:
one or more silicates, and
a processing aid comprising a cellulosic thickening agent,
wherein the silicate is present in the binder formulation in a range of 60-98 wt. % of the binder formulation,
wherein the processing aid is present in the binder formulation in a range of 5-25 wt. % of the binder formulation, and
wherein the iron ore pellets comprises the one or more silicates in the range of 1-10 wt. % of the iron ore pellets.

10. The process according to claim 9, wherein the pellets are formed using a method selected from extrusion, pan pelletisation and briquetting.

11. The iron ore pellet according to claim 3, wherein the sodium silicate has a Na to Si ratio greater than 2.5.

12. The iron ore pellet according to claim 1, wherein the silicate is present in the binder formulation in a range of 75-95 wt. % of the binder formulation.

13. The iron ore pellet according to claim 1, wherein the processing aid is present in the binder formulation in a range of 10-20 wt % of the binder formulation.

14. The iron ore pellet of claim 1, wherein the binder formulation comprises:
75-95 wt % sodium silicate,
5-25 wt % of the processing aid, wherein the processing aid comprises guar gum and methyl hydroxyethyl cellulose, and
0.1-1 wt % of a setting agent comprising glycidoxypropyltrimethoxysilane.

15. The iron ore pellet of claim 1, wherein the iron ore pellet comprises:
1-10 wt % sodium silicate, and
0.1-2 wt % of the processing aid, wherein the processing aid comprises guar gum and methyl hydroxyethyl cellulose.

* * * * *